Patented Feb. 25, 1936

2,032,111

UNITED STATES PATENT OFFICE 2,032,111

BLUE DYEING AZODYESTUFFS

Gérald Bonhôte, Basel, and Carl Apotheker, Riehen, near Basel, Switzerland, assignors to Society of Chemical Industry in Basle, Basel, Switzerland No Drawing. Application March 13, 1935, Serial No. 10,960. In Switzerland April 14, 1934

6 Claims. (Cl. 260—95)

In application Serial No. 736,613, filed July 23, 1934, it has been shown that valuable blue azodyestuffs may be obtained by coupling arylides of 2,3-hydroxynaphthoic acid, which have been obtained by condensing 2,3-hydroxynaphthoic acid with aniline or with an analogue or homologue of aniline which may be regarded as an ortho-substitution product of aniline, with the diazo-compounds of the general formula:

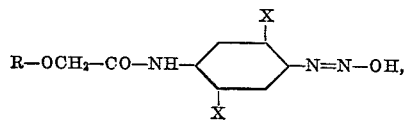

in which R represents an aromatic nucleus of the benzene series and both X's are ethoxy.

This invention relates to an improvement in or a modification of that described in the aforesaid application. By this invention new blue dyestuffs are obtained which have the same valuable properties as are possessed by the dyestuffs produced by the process of the aforesaid application and are made by coupling the diazo-compound of the foregoing general formula with an arylide of 2,3-hydroxynaphthoic acid of the general formula

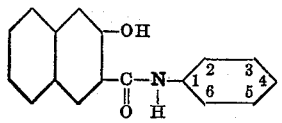

in which the positions 2, 4 and 6 of the arylide radical are occupied by hydrogen atoms, and in which further at least one of the positions 3 or 5 is substituted by a substituent which does not provoke solubility of the arylide in water. Such radicals, in contradistinction to radicals such as SO₃H, COOH, OH, SO₂H, and the like, are radicals such as halogen, alkyl or alkoxy. Such arylides are, for example, the meta-toluidide, the meta-chloranilide, the meta-nitranilide, the meta-bromanilide, the meta-iodoanilide of the 2,3-hydroxynaphthoic acid. Products falling also under the above definition are the arylides from 2,3-hydroxynaphthoic acid and 1-amino-3,5-dichlorobenzene.

The new dyestuffs correspond to the general formula

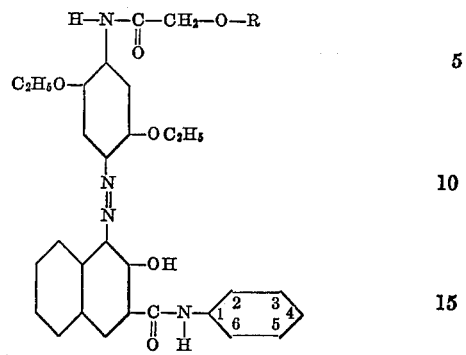

in which R represents a nucleus of the benzene series, and in which the positions 2, 4 and 6 of the arylide radical are substituted by hydrogen atoms and at least one of the positions 3 or 5 is substituted by another substituent. The new dyestuffs are dark, violet to blue powders insoluble in water but dissolving in sulfuric acid to blue solutions, and in pyridine to violet solutions, and dyeing the fiber fast blue tints. It is remarkable here that the nature of the substituents in 3- or 5-position of the arylide nucleus has no essential effect on the shades and properties of the dyestuff. The position of the substituent, however, is of considerable importance.

Particularly valuable dyeings are obtained when cotton, wool or silk is grounded, by known methods, with one of the aforesaid arylides and then the latter is coupled with one of the aforesaid diazo-compounds.

The following examples illustrate the invention, the parts being by weight:—

Example 1

Cotton yarn is impregnated with a solution containing per litre 5.5 grams of 2,3-hydroxynaphthoic acid 3'-methylanilide, 10 cc. of caustic soda solution of 34° Bé., 10 cc. of Turkey red oil; the yarn is thoroughly wrung out and developed in a diazo solution containing 2 grams per litre of 4-phenoxy-acetylamino-2,5-diethoxy-1-aminobenzene. There is produced a pure blue tint of very good properties of fastness. The new dyestuff has the following constitution

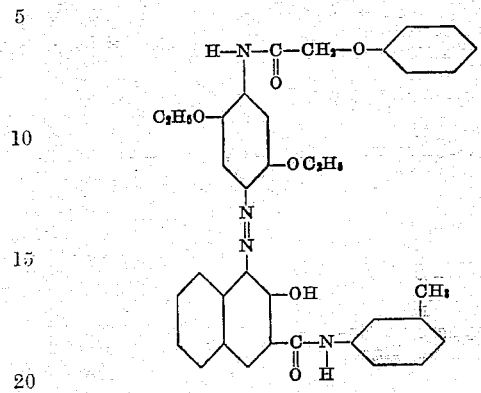

A blue tint of very good fastness to light is also obtained when the 3'-chloranilide of 2,3-hydroxynaphthoic acid is used.

*Example 2*

Cotton yarn is grounded with an alkaline solution containing per litre 7 grams of 2,3-hydroxynaphthoic acid 3'-methylanilide and well wrung out; it is then developed in a solution containing per litre 2 grams of diazotized 4(2'-methyl)-phenoxy-acetylamino-2,5-diethoxy-1-aminobenzene. A pure blue of very good fastness to light is produced.

Like blue tints are obtained when 2,3-hydroxynaphthoic acid 3'-chloranilide is used.

The dyestuffs of this example correspond to the formula

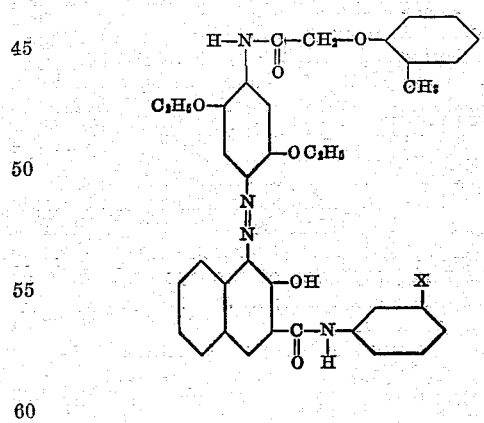

in which $x$ stands for $CH_3$ or $Cl$. The properties of fastness of the two dyestuffs are very similar.

*Example 3*

The material to be printed is foularded with an alkaline solution containing per litre 12 grams of 2,3-hydroxynaphthoic acid 3'-methylanilide or 3'-chloranilide. After drying the material is printed with a color which contains per kilo 10 grams of the diazotized 4-(3'-methyl)-phenoxy-acetylamino-2,5-diethoxy-1-aminobenzene. The pure blue dyeing develops very quickly and is very fast.

The procedure is similar with the arylides of the 2,3-hydroxynaphthoic acid cited in the preamble. Valuable dyestuffs are also obtained when using diazotizing components such as, for example, 4'-(2'-methyl)-phenoxyacetylamino-2,5-diethoxy-1-aminobenzene, 4-(4'-methyl)-phenoxyacetylamino-2,5-diethoxy-1-aminobenzene, 4-(2'-chloro)-phenoxyacetylamino-2,5-diethoxy-1-aminobenzene, 4-(2'-methoxy)-phenoxyacetylamino-2,5-diethoxy-1-aminobenzene, 4-(3'-bromo)-phenoxyacetylamino-2,5-diethoxy-1-aminobenzene, 4-(4'-ethoxy)-phenoxyacetylamino-2,5-diethoxy-1-aminobenzene, 4-(4'-chloro)-phenoxyacetylamino-2,5-diethoxy-1-aminobenzene, 4-(4'-methylsulfone)-phenoxyacetylamino-2,5-diethoxy-1-aminobenzene and the like.

What we claim is:—

1. The dyestuffs of the general formula

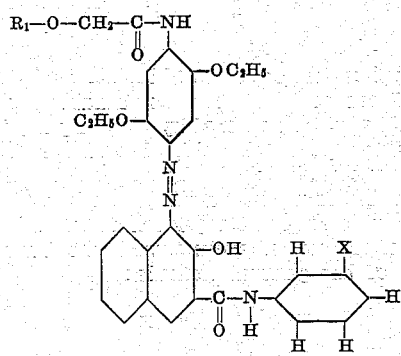

in which $R_1$ represents an aromatic nucleus of the benzene series and $x$ stands for halogen, alkyl or alkoxy, which products are dark blue powders insoluble in water but dissolving in pyridine to violet solutions, and in sulfuric acid to blue solutions, and dye the cotton fiber fast blue tints.

2. The dyestuffs of the general formula

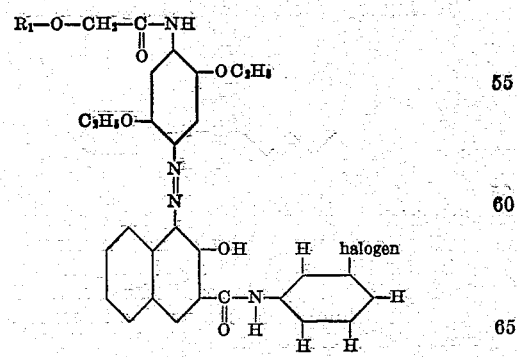

in which $R_1$ represents an aromatic nucleus of the benzene series, which products are dark blue powders insoluble in water, but dissolving in pyridine to violet solutions, and in sulfuric acid to blue solutions, and dye cotton fiber fast blue tints.

3. The dyestuffs of the general formula

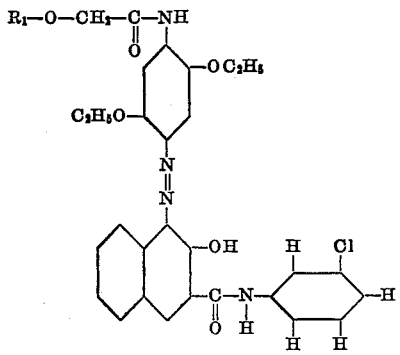

in which $R_1$ represents an aromatic nucleus of the benzene series, which products are dark blue powders insoluble in water, but dissolving in pyridine to violet solutions, and in sulfuric acid to blue solutions, and dye cotton fiber fast blue tints.

4. The dyestuffs of the general formula

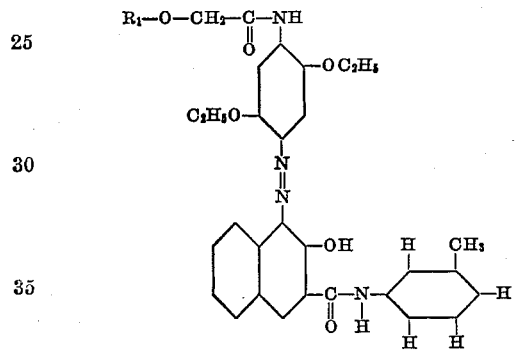

in which $R_1$ represents an aromatic nucleus of the benzene series, which products are dark blue powders insoluble in water, but dissolving in pyridine to violet solutions, and in sulfuric acid to blue solutions, and dye the cotton fiber fast blue tints.

5. The dyestuff of the formula

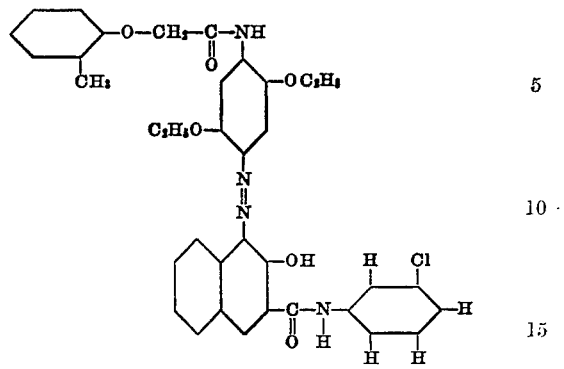

which product is a dark blue powder insoluble in water, but dissolving in pyridine to a violet solution and in sulfuric acid to a blue solution, and dyes the cotton fiber fast blue tints.

6. The dyestuff of the formula

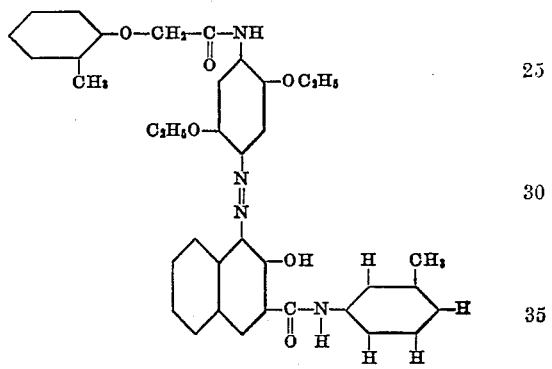

which product is a dark blue powder insoluble in water, but dissolving in pyridine to a violet solution and in sulfuric acid to a blue solution, and dyes the cotton fiber fast blue tints.

GÉRALD BONHÔTE.
CARL APOTHEKER.